United States Patent [19]
Freije

[11] Patent Number: 6,086,657
[45] Date of Patent: Jul. 11, 2000

[54] EXHAUST EMISSIONS FILTERING SYSTEM

[76] Inventor: Joseph P. Freije, P.O. Box 263, Franklin, Ind. 46131

[21] Appl. No.: 09/250,600

[22] Filed: Feb. 16, 1999

[51] Int. Cl.[7] .................................................. B01D 35/06
[52] U.S. Cl. ..................... 95/2; 55/282.3; 55/DIG. 10; 95/28; 95/29; 95/69; 95/278; 96/2; 96/3; 96/16; 96/18; 96/224; 96/339
[58] Field of Search ..................... 95/2, 28, 29, 63, 95/69, 278; 96/1, 2, 3, 16, 18, 224, 389, FOR 173; 55/DIG. 10, 282.3

[56] References Cited

U.S. PATENT DOCUMENTS

| | | | |
|---|---|---|---|
| 2,637,408 | 5/1953 | Yadoff | 95/28 |
| 3,094,400 | 6/1963 | Blanton | 96/16 |
| 3,389,971 | 6/1968 | Alliger | 96/16 |
| 3,804,942 | 4/1974 | Kato et al. | 95/69 |
| 3,844,741 | 10/1974 | Dimitrik | 96/16 |
| 3,936,280 | 2/1976 | Briggs | 95/28 |
| 4,203,948 | 5/1980 | Brundbjerg | 96/224 |
| 4,750,917 | 6/1988 | Fujii | 96/224 |
| 5,060,805 | 10/1991 | Fujii et al. | 96/16 |
| 5,879,435 | 3/1999 | Satyapal et al. | 96/224 |
| 5,900,043 | 5/1999 | Grandjean et al. | 95/29 |

*Primary Examiner*—Duane S. Smith
*Attorney, Agent, or Firm*—Brinks Hofer Gilson & Lione

[57] ABSTRACT

An exhaust emissions filtering system for filtering of particulate matter from a flow of exhaust. The exhaust emissions filtering system comprises an ultrasonic transducer unit, an ultraviolet light unit, a magnetic particle filter unit, and an electronic control unit. The exhaust emissions filtering system removes particulates from exhaust emissions by fracturing the particles with the ultrasonic transducer unit, further breaking down the fractured particles with a high-intensity ultraviolet light, and removing the particles with an electrostatic mesh that is located in the magnetic particle filter unit.

18 Claims, 5 Drawing Sheets

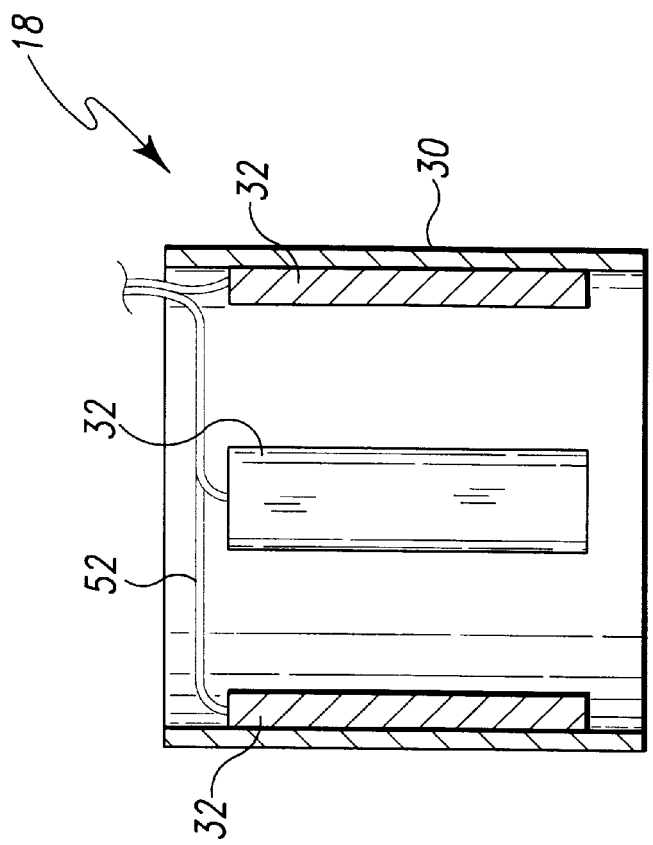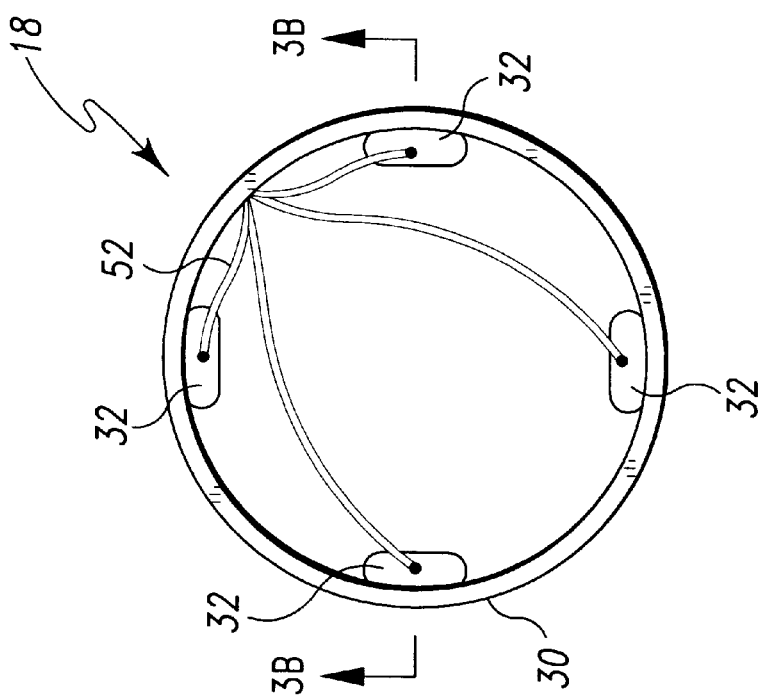
Fig. 3A
Fig. 3B

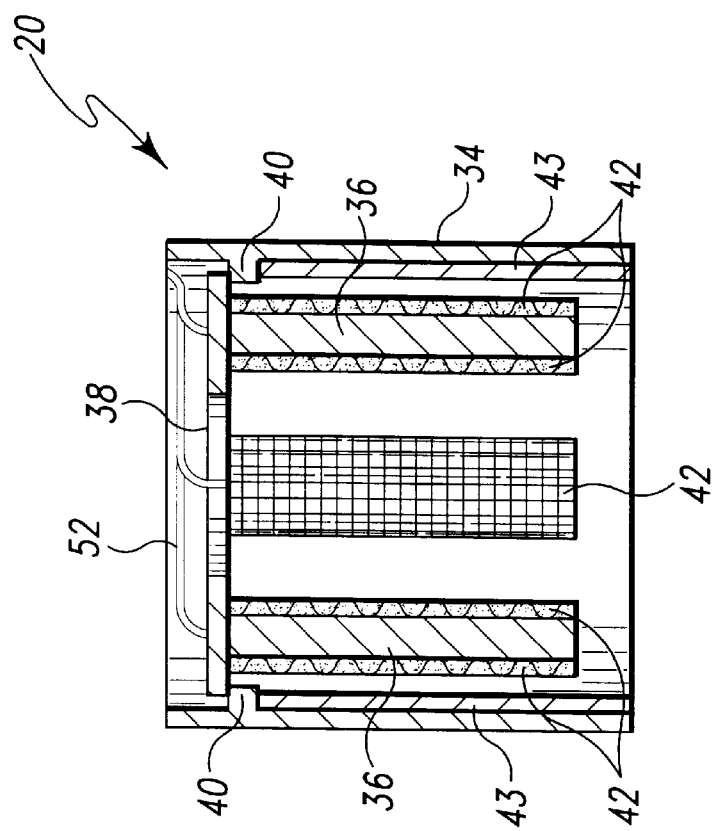
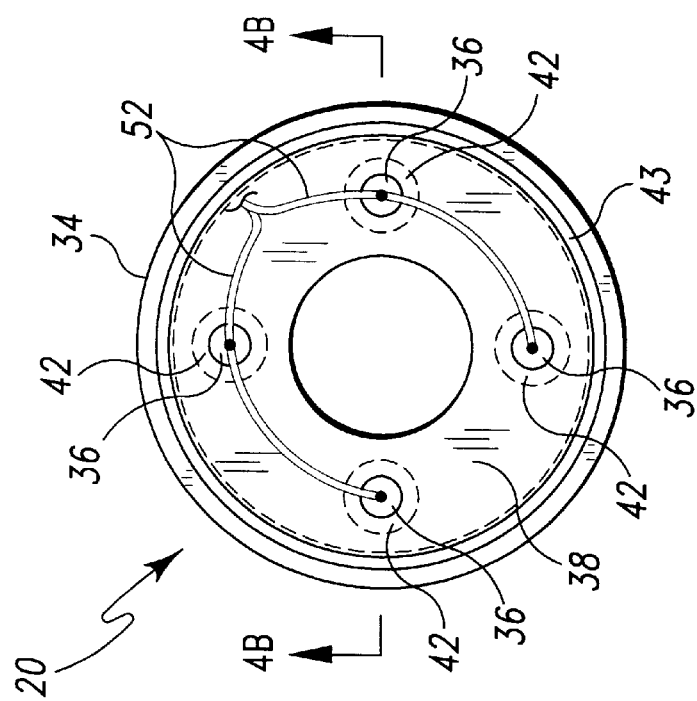
Fig. 4B
Fig. 4A

6,086,657

EXHAUST EMISSIONS FILTERING SYSTEM

FIELD OF THE INVENTION

The present invention relates generally to a filtering system, and more specifically to an exhaust emissions filtering system and method of reducing the amount of particulate materials discharged into the atmosphere from the exhaust of internal combustion engines and the like.

BACKGROUND OF THE INVENTION

Exhaust emissions from combustion engines have increasingly become an environmental concern. As environmental laws become more restrictive each year, numerous methods and apparatuses have been developed to reduce the level of pollution materials in the exhaust.

Exhaust emissions are derived from the complete and incomplete combustion of fuel and air. These exhaust emissions have an unstable molecular mass as a result of the combustion process. Primarily, the exhaust emissions consist of a mixture of gases and low molecular weight carbonic particles. Sometimes the exhaust can include traces of oil lubricants. Depending on the fuel being burned by the engine, carbon and various formations thereof typically account for a majority of the particulate content in exhaust, as much as 80 percent in the case of diesel engines. Pollution control efforts, therefore, have focused on the reduction of particulate matter found in exhaust.

Diesel engines are credited with largely contributing to air pollution because they have a higher rate of exhaust emissions containing oxides of nitrogen (NOx) and carbonaceous particulate matter compared with that of gasoline engines. However, because of the durability and economy of diesel engines, they are frequently chosen over traditional spark-ignition gasoline engines in a significant number of trucks, buses, agricultural equipment, locomotives, ships, and stationary applications. Diesel engines also maintain a large popularity with European automobile manufacturers.

Apparatuses for reducing particulate matter in engine exhaust are known in the art. In a typical exhaust filter for a combustion engine, filtering of particulate matter is achieved by directing the exhaust through a porous material. The porous material captures particles that are large enough to become caught in the diameter of its pores. The remaining particles that are not captured within the porous material are discharged into the atmosphere.

Because of the inherent disadvantages in utilizing particle-capturing porous materials as filtering elements, the exhaust filtering systems in use today have several shortcomings. One such shortcoming is the compromise that must be made between filtering effectiveness and engine performance. For optimal filtering effectiveness, the porous material used in the system has a pore size that is small enough to capture the smallest particles discharged by the engine. In contrast, optimal engine performance demands large pores (or no filtering system at all), allowing for a free flow of exhaust through the exhaust line. Because of these competing interests inherent with engine performance and pollution, engine performance and filtering effectiveness have always been compromised.

Furthermore, in certain operating conditions, it is imperative to relieve the back pressure in the exhaust line that necessarily results from a restrictive porous filtering system. To that end, some filters are designed so that they provide an alternate unrestricted bypass for the flow of exhaust. This yields a more expensive product, and diminishes filtering effectiveness.

Yet another disadvantage of the particulate filters in use today is the variation in engine efficiency that necessarily results from extended use of the filtering systems. As particles are caught and build up in the filtering system pores, exhaust is increasingly restricted. Eventually, the filter will need to be replaced, or will need to undergo regeneration, whereby the filter is heated to a temperature that incinerates the particulate buildup, clearing the porous material of obstructive particles.

SUMMARY OF THE INVENTION

The present invention discloses an exhaust emissions filtering system that provides effective filtering of particulate matter, does not restrict the flow of exhaust, and accommodates for the buildup of particulate matter associated with extended use without interfering with the flow of exhaust. In the invention, particles are removed from flowing exhaust by fracturing the particles into smaller pieces with an ultrasonic transducer, then further breaking the particles down with a high-intensity ultraviolet light, and finally, removing the particles from the flow of exhaust using a magnetic particle filtering unit.

The exhaust emissions filtering system includes an ultrasonic transducer unit, an ultraviolet light unit, a magnetic particle filtering unit and an electronic control unit. During operation, the ultrasonic transducer unit bombards the flow of exhaust with ultrasonic waves operating at least at 20,000 cycles per second. The ultrasonic waves break down the particulates found in the exhaust into much smaller particulates. Next, the fragmented particulates are exposed to high-intensity ultraviolet light in the ultraviolet light unit, which further breaks down and weakens the particles due to the heat and energy generated by the high-intensity ultraviolet lights. The high-intensity ultraviolet lights vaporize some of the smaller particulates. Finally, the exhaust passes through the magnetic particle filtering unit, where the fragmented particles are removed from the flow of exhaust by the ion-attracting forces of a magnetic field that is created by the magnetic particle filtering unit.

The magnetic particle filtering unit generates a magnetic field with a plurality of magnetic rods that are electrically connected with a electronic control unit. The magnetic particle filtering unit includes a cylindrical housing that may also be electrically connected with the electronic control unit so that it can also be energized to create a magnetic field. Each respective magnetic rod is surrounded by a mesh screen that may also be electrically connected with the electronic control unit. In addition, the inner diameter of the cylindrical housing may be surrounded by a second mesh screen, which may also be connected with the electronic control unit.

During operation, the magnetic rods and the cylindrical housing are energized by the electronic control unit, which causes particulates found in the exhaust to be attracted to the wall of the cylindrical housing and the magnetic rods. The mesh screens that surround the cylindrical housing and the magnetic rods are designed with small pore sizes, small enough to capture the exhaust particulates as they are attracted by the magnetic forces generated by the rods and the cylindrical housing. The electronic control unit is electrically connected with each mesh screen for providing electrical current to the mesh screens. These currents will heat the mesh screens to hot temperatures so that some of the particulates that get trapped in the mesh screens become incinerated.

The design of the exhaust emissions filtering system allows for the free flow of exhaust without the buildup of particulate matter that eventually encumbers an engine's efficiency. The only particulate buildup that occurs is located in the magnetic particle filtering unit, which is readily replaceable. The removable design of the magnetic particle filtering unit facilitates replacement, and cleaning methods can include regeneration for incinerating the particulate buildup around the magnetic elements and also various chemical cleaning methods.

A cylindrical housing may be included to encompass the exhaust emissions filtering system, allowing for an easy retrofit of the system in existing exhaust systems. Furthermore, the system can run on a minimal amount of current that is supplied by the vehicle's electronic system.

Another embodiment of the invention could be fitted for placement inside industrial smokestacks or any other exhaust discharge area containing particulate matter. Utilizing the same principles, the exhaust emissions filtering system would break down the particles with an ultrasonic transducer unit, further break down the particles with an ultraviolet light unit, and finally, remove the particles from the flow of exhaust with magnetic forces in a magnetic particle filtering unit.

Yet another use may be found in the residential home. Upon being secured inside a chimney, the exhaust emissions filtering system would effectively reduce the amount of particulate matter that is discharged into the atmosphere from fireplaces and heating systems. Homeowners could prevent particulate buildup within the chimney, thereby avoiding routine chimney cleanings and unnecessary fire hazards.

These and other features and advantages of the invention will become apparent upon consideration of the following detailed description of the presently preferred embodiments of the invention, viewed in conjunction with the appended drawings.

BRIEF DESCRIPTION OF THE DRAWINGS

FIG. 3A is a top view of an ultraviolet light unit.

FIG. 3B is a cross-sectional front view of the ultraviolet light unit depicted in FIG. 3A.

FIG. 4A is a top view of a magnetic particle filtering unit.

FIG. 4B is a cross-sectional front view of the magnetic particle filtering unit depicted in FIG. 4A.

DETAILED DESCRIPTION OF THE PRESENTLY PREFERRED EMBODIMENTS

Figure 1:
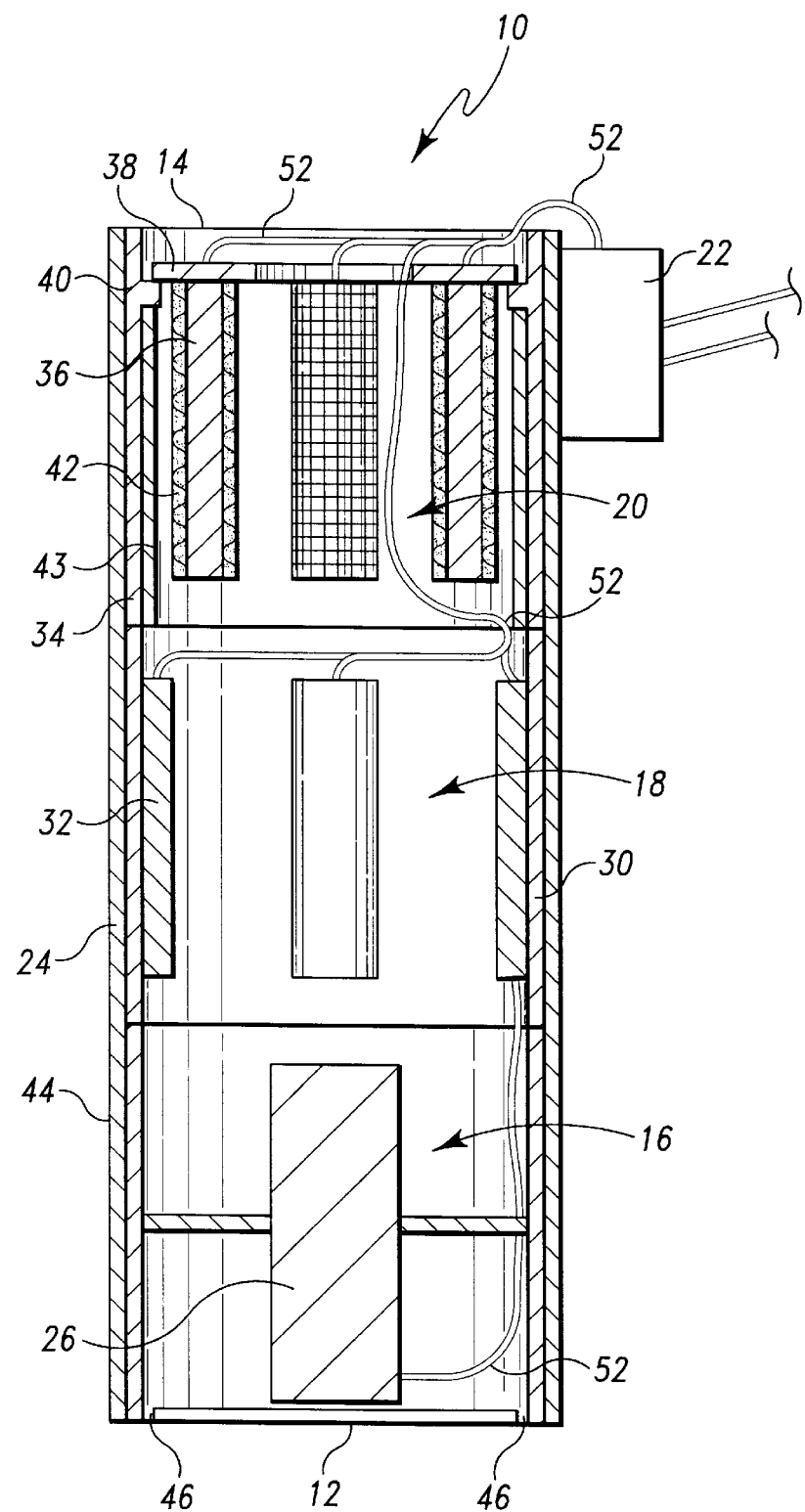
FIG. 1 is a cross-sectional front view of an exhaust emissions filtering system.

FIG. 1 illustrates one preferred embodiment of an exhaust emissions filtering system 10 used for reducing the emission of particulate materials found in exhaust gases, such as from an internal combustion engine. As illustrated, the exhaust emissions filtering system 10 includes an exhaust inlet 12, an exhaust outlet 14, an ultrasonic transducer unit 16, an ultraviolet light unit 18, a magnetic particle filter unit 20, and an electronic control unit 22. During operation, the ultrasonic transducer unit 16 bombards exhaust particulates with ultrasonic sound waves as the exhaust enters the exhaust emissions filtering system 10. The ultrasonic sound waves break down the particulates in the exhaust into much smaller pieces. Next, the exhaust particulates are exposed to high-intensity ultraviolet light with the ultraviolet light unit 18, which further breaks down the exhaust particulates and incinerates some of the smaller pieces. Finally, the exhaust particulates are pulled from the exhaust and captured in the magnetic particle filtering unit 20 where they are ultimately incinerated or remain permanently captured.

Figure 2B:
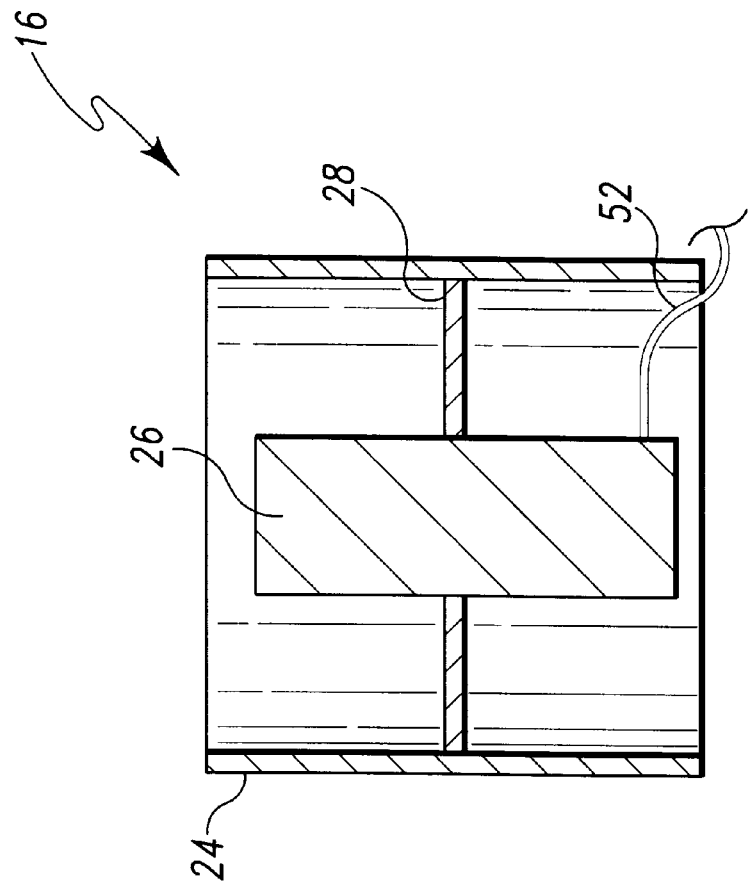
FIG. 2B is a cross-sectional front view of the ultrasonic transducer unit depicted in FIG. 2A.
Figure 2A:
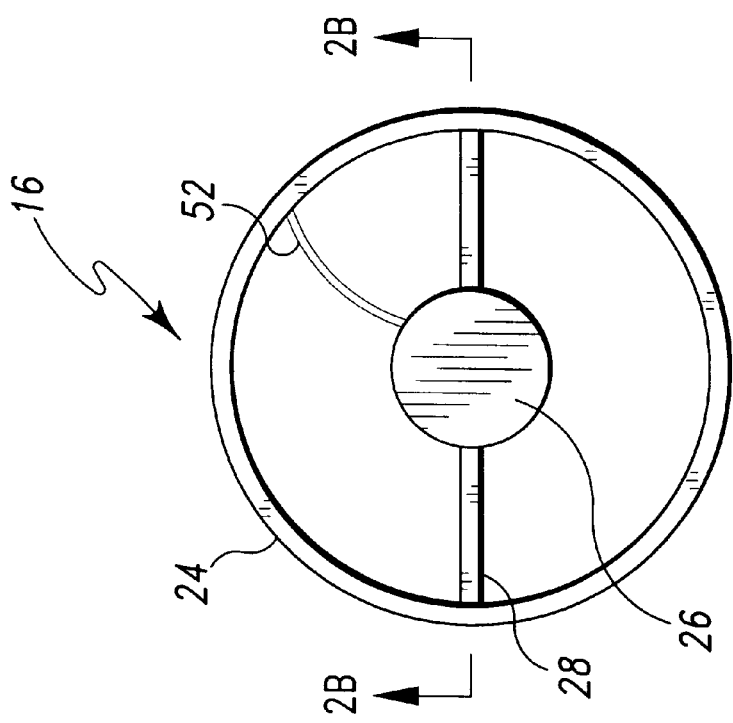
FIG. 2A is a top view of an ultrasonic transducer unit.

Referring to FIGS. 2A and 2B, the ultrasonic transducer unit 16 includes a first cylindrical housing 24, at least one ultrasonic transducer 26, and an ultrasonic transducer support bracket 28. As previously set forth, the ultrasonic transducer 26 radiates ultrasonic sound waves across the flow of exhaust during operation of the exhaust emissions filtering system 10. The ultrasonic sound waves are set to oscillate at at least 20,000 cycles per second. These ultrasonic sound waves break down particulates found in the exhaust into much smaller particulates as the exhaust travels through the ultrasonic transducer unit 16. In FIGS. 2A and 2B, the ultrasonic transducer 26 is secured in the first cylindrical housing 24 with the assistance of the ultrasonic transducer bracket 28. As illustrated, the ultrasonic transducer bracket 28 is connected with the first cylindrical housing 24 and the ultrasonic transducer 26. The ultrasonic transducer bracket 28 may be connected with the first cylindrical housing 24 by any conventional connection means, such as, for example, by welding, bolting, or screwing the ultrasonic transducer bracket 28 to the first cylindrical housing 24.

Ultrasonic transducers 26 may be manufactured to accommodate virtually any design specification and are readily available through numerous manufacturers. Two manufacturers of such ultrasonic transducers are Ultrasonic Power Company and Surftran/Martin. The number of ultrasonic transducers 26 used in the ultrasonic transducer unit 16 may vary, depending on the amount of exhaust that flows through the exhaust emissions filtering system 10. When a large amount of exhaust flows through the exhaust emissions filtering system 10, it may be preferable to utilize more than one ultrasonic transducer 26.

Referring to FIGS. 3A and 3B, the ultraviolet light unit 18 includes a second cylindrical housing 30 and at least one ultraviolet light 32. The ultraviolet lights 32 can be connected with the second cylindrical housing 30 by any conventional means, such as bolts, straps, screws, brackets or integrated lamp sockets. During operation, the ultraviolet lights 32 transmit high-intensity ultraviolet light over a predetermined area, which further breaks down the particulates found in the exhaust as it travels through the ultraviolet light unit 18. In addition, when the ultraviolet lights 32 are operational, heat is generated by the ultraviolet lights 32, which will incinerate a small amount of the particulates found in the exhaust.

An example of an ultraviolet light 32 that might be used in the exhaust emissions filtering system 10 is the Sylvania G8T5 Hard Ultra-violet G-spectrum light. In the embodiment depicted in FIGS. 3A and 3B, four ultraviolet lights 32 are disclosed in the ultraviolet light unit 18 for illustrative purposes only. One should recognize that the number, power, and size of the ultraviolet lights 32 used in the ultraviolet light unit 18 will vary, depending on the amount of exhaust the exhaust emissions filtering system 10 is designed to handle. Generally speaking, the more exhaust the exhaust emissions filtering system 10 is required to filter, the greater the number of ultraviolet lights 32 that should be used.

Referring to FIGS. 4A and 4B, the magnetic particle filtering unit 20 includes a third cylindrical housing 34, at least one magnetic rod 36 and a magnetic rod bracket 38. The magnetic particle filtering unit 20 removes particulates in the exhaust by attracting and capturing the particulates. Once captured, some of the exhaust particulates are incinerated by the magnetic particle filtering unit 20. As illustrated in FIGS. 4A and 4B, the third cylindrical housing 34 includes at least one stop 40, which is used to secure the magnetic rod bracket 38 within the third cylindrical housing 34 at a predetermined depth. The magnetic rod bracket 38 may be designed for a friction fit within the inner diameter of the third cylindrical housing 34.

During operation, the magnetic rods 36 and the third cylindrical housing 34 create a magnetic field, thereby attracting and capturing exhaust particulates within a first mesh screen 42 that surrounds each respective magnetic rod 36 and a second mesh screen 43 that surrounds the inner diameter of the third cylindrical housing 34. When assembled, the magnetic rods 36, the third cylindrical housing 34, the first mesh screen 42 and the second mesh screen 43 are electrically connected with the electronic control unit 22 by a plurality of conductive wires 52. The electronic control unit 22 energizes the magnetic rods 36 and the third cylindrical housing 34 during operation, which creates the magnetic field that attracts the particulates to the first mesh screen 42 and the second mesh screen 43. The mesh screens 42, 43 may also be energized with the electronic control unit 22 to heat the mesh screens 42, 43 to high temperatures, thereby causing the captured particulates to be incinerated on the mesh screens 42, 43.

The magnetic rods 36 and the third cylindrical housing 34 may be made from any iron based conductive metal or many different combinations of conductive alloys. The number of magnetic rods 36 and size of the magnetic rods 36 will vary, depending on the amount of exhaust the exhaust emissions filtering system 10 is designed to handle. Typically, the larger the flow of exhaust, the higher the number of magnetic rods 36 that will be used. In the disclosed embodiment depicted in FIGS. 4A and 4B, four magnetic rods 36 are depicted by way of example only.

The mesh screens 42, 43 that are used in the magnetic particle filtering unit are preferably designed so that the pore size of the mesh screens 42, 43 is small enough to capture tiny particulates found in the flow exhaust. As previously stated, the mesh screens 42, 43 are used to surround each magnetic rod 36 and a portion of the inner diameter wall of the third cylindrical housing 34. When the magnetic rods 36 and the third cylindrical housing 34 are energized, particulates are attracted to the mesh screens 42, 43, which in turn capture the particulates before allowing the particulates to exit into the atmosphere. Mesh filtering screens have been used for decades in a variety of applications, such as automobile oil filters and air filters. Two manufacturers of such mesh screens are Fluid Dynamic/Memtec Group and Beverlin Manufacturing Corporation.

Figures 5A, 5B:
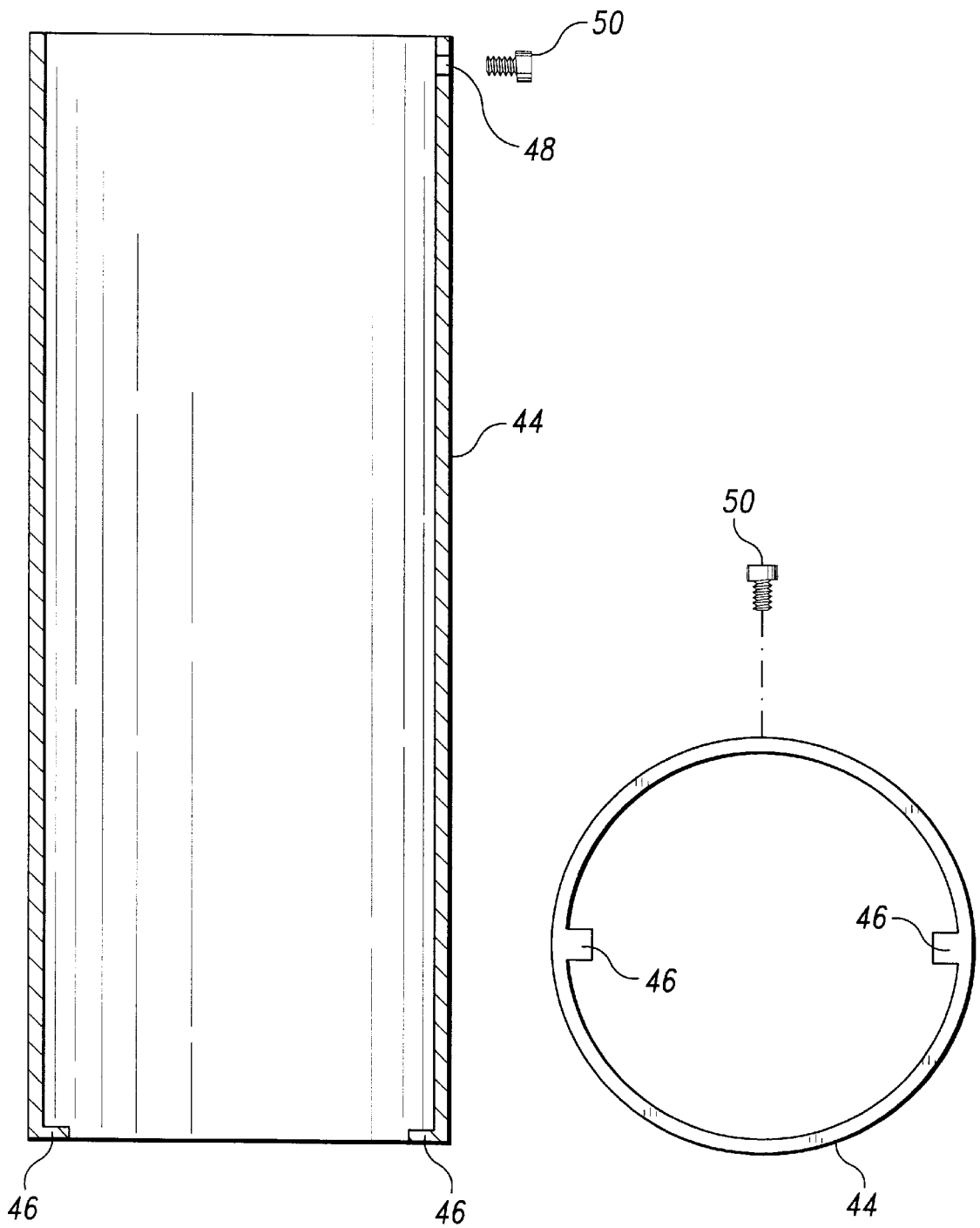
FIG. 5A is a cross-sectional front view of a cylindrical housing.
FIG. 5B is a top view of the cylindrical housing depicted in FIG. 5A.

Referring to FIGS. 1 and 5, a cylindrical housing 44 is illustrated that may be used to hold the ultrasonic transducer unit 16, the ultraviolet light unit 18 and the magnetic particle filter unit 20 in the exhaust path of an engine (not shown). The ultrasonic transducer unit 16, the ultraviolet light unit 18 and the magnetic particle filter unit 20 may be designed for a friction fit within the cylindrical housing 44. In alternative embodiments, the cylindrical housing 44 may include at least one positioning piece 46, which acts as stop for the ultrasonic transducer unit 16 when it is placed in the cylindrical housing 44. A housing aperture 48 may also be provided for a set screw 50 that can be used to secure the magnetic particle filtering unit 20 within the housing 44. Those skilled in the art would recognize that the ultrasonic transducer unit 16, the ultraviolet light unit 18 and the magnetic particle filtering unit 20 may also be designed to be positioned in a conventional exhaust line (not shown), thereby alleviating the need for a separate cylindrical housing 44.

Referring to FIG. 1, the ultrasonic transducer 26, the ultraviolet lights 32 and magnetic rods 36 are electrically connected with the electronic control unit 22 by a plurality of conductive wires 52. In addition, the third cylindrical housing 34 and the mesh screens 42, 43 may also be electrically connected with the electronic control unit 22 by conductive wires 52. The electronic control unit 22 electrically energizes the above-mentioned items during operation by providing electrical energy to respective conductive wires 52. The electronic control unit 22 receives its electrical energy by being electrically connected with a power source (not shown), such as the battery or alternator of a motor vehicle or a conventional power source in stationary applications.

The exhaust emissions filtering system 10 also discloses an optimal method of removing particulates from exhaust. First, when a flow of exhaust travels through an exhaust line (not shown), it enters the exhaust emissions filtering system 10 at the exhaust inlet 12 where it is immediately bombarded by ultrasonic sound waves that are transmitted by the ultrasonic transducers 26 in the ultrasonic transducer unit 16. The ultrasonic sound waves cause particulates found in the exhaust to fracture, thereby breaking the particles into smaller pieces that can be more readily filtered downstream.

After leaving the ultrasonic transducer unit 16, the exhaust passes through the ultraviolet light unit 18, which further breaks down the particulates found in the exhaust with the high-intensity ultraviolet lights 32. After leaving the ultraviolet light unit 18, the particles and exhaust travel to the magnetic particle filtering unit 20. In the magnetic particle filtering unit 20, the particles in the exhaust are attracted by magnetic forces that are generated by the magnetic rods 30 and the third cylindrical housing 34, and are subsequently removed from the flow of exhaust by the mesh screens 42, 43. The mesh screens 42, 43 capture the particles because they have pore sizes smaller than the particulates found in the exhaust after being broken down by the ultrasonic transducers 26 and the ultraviolet lights 32. After passing through the magnetic particle filtering unit 20, the remaining exhaust is discharged to the atmosphere through the exhaust outlet 14.

In the disclosed preferred embodiment depicted in FIG. 1, the electronic control unit 22 is secured to the cylindrical housing 44. However, one should recognize that if the exhaust emissions filtering system 10 is used on a vehicle, the electronic control unit 22 may be connected to various other locations on the vehicle. In the preferred embodiment, the electronic control unit 22 only energizes the exhaust emissions filtering system 10, while the engine is running or only when exhaust is being emitted in other applications. In stationary applications such as a smokestack or chimney, the electronic control unit 22 may be mounted at any convenient location for easy access.

Those skilled in the art will recognize that the exhaust emissions filtering system 10 can be applied in industrial and residential uses as well. The cylindrical housing 44, encompassing the ultrasonic transducer unit 16, the ultraviolet light unit 18, and the magnetic particle filter unit 20, can be retrofit or modified to fit inside a smokestack or any other exhaust discharge area. Exhaust travelling through the smokestack is subjected to ultrasonic waves for fracturing the exhaust particles, ultraviolet light that further breaks down and weakens the particles in the exhaust, and the magnetic particle filter that creates a magnetic field for removing the particles from the flow of the exhaust.

Although the above-described sequential arrangement of ultrasonic transducer unit 16, ultraviolet light unit 18 and magnetic particle unit 20 in exhaust emission filtering system 10 is preferred, those skilled in the art will recognize that alternative arrangements may be utilized in particular application, and such alternative arrangements are within the scope of this invention.

While the invention has been described in its currently best known modes of operation and embodiments, other modes and embodiments of the invention will be apparent to those skilled in the art and are contemplated. It is, therefore, the following claims, including all equivalents, which are intended to define the spirit and scope of the invention.

I claim:

1. An exhaust emissions particle filtering system, comprising:

an ultrasonic transducer unit having at least one ultrasonic transducer for applying ultrasonic energy to particulates in a flow of exhaust;

an ultraviolet light unit having at least one ultraviolet light for breaking down the particulates in said flow of exhaust;

a magnetic particle filtering unit having at least one magnetic rod for creating a magnetic field and a mesh screen surrounding said at least one magnetic rod for capturing particulates attracted by said magnetic field; and an electronic control unit electrically connected with said ultrasonic transducer unit, said ultraviolet light unit and said magnetic particle filtering unit thereby providing electrical energy to said exhaust particle filtering system.

2. The exhaust particle filtering system of claim 1, further including a second mesh screen surrounding the inner diameter wall of the magnetic particle filtering unit.

3. The exhaust particle filtering system of claim 2, wherein said second mesh screen is electrically connected with said electronic control unit, said electronic control unit providing electrical current to said second mesh screen, thereby heating said second mesh screen and incinerating particulates captured in said second mesh screen.

4. The exhaust particle filtering system of claim 1, wherein said mesh screen is electrically connected with said electronic control unit, said electronic control unit providing electrical current to said mesh screen, thereby heating said mesh screen and incinerating particulates captured in said mesh screen.

5. The exhaust particle filtering system of claim 1, further including a cylindrical housing holding said ultrasonic transducer unit, said ultraviolet light unit and said magnetic particle filtering unit.

6. The exhaust particle filtering system of claim 5, wherein said ultrasonic transducer unit, said ultraviolet light unit, and said magnetic particle filter are friction fit inside the inner diameter of said cylindrical housing.

7. A method of filtering particulate materials from a flow of exhaust emissions, comprising the steps of:

directing said flow of exhaust emissions into an ultrasonic transducer unit;

fracturing particles contained in said flow of exhaust emissions with at least one ultrasonic transducer in said ultrasonic transducer unit;

directing said flow of exhaust emissions from said ultrasonic transducer unit to an ultraviolet light unit;

exposing said flow of exhaust emissions to ultraviolet light with at least one ultraviolet light in said ultraviolet light unit, said ultraviolet light being used to further break down the particulates in said flow of exhaust emissions;

directing said flow of exhaust emissions from said ultrasonic transducer unit to a magnetic particle filtering unit;

removing said particulate materials in said flow of exhaust emissions by attracting said particulate materials to a magnetic field generated by at least one magnetic rod and then capturing said particulate materials in a mesh screen that surrounds each respective magnetic rod; and controlling said ultrasonic transducer unit, said ultraviolet light unit and said magnetic particle filtering unit with an electronic control unit.

8. The method of claim 7, further comprising the step of surrounding the inner diameter wall of the magnetic particle filtering unit with a second mesh screen for capturing said particulate materials in said flow of exhaust emissions.

9. The method of claim 8, further comprising the step of incinerating said particulate materials captured in said second mesh screen by applying current to said second mesh screen with said electronic control unit, thereby heating said second mesh screen.

10. The method of claim 7, further comprising the step of incinerating said particulate materials captured in said mesh screen by applying current to said mesh screen with said electronic control unit, thereby heating said mesh screen.

11. The method of claim 7, further comprising the step of providing a cylindrical housing having an exhaust inlet and an exhaust outlet, wherein said ultrasonic transducer unit, said ultraviolet light unit, and said magnetic particle filter are friction fit within the diameter of said cylindrical housing.

12. An exhaust filtering system for use in an exhaust line of an internal combustion engine, comprising:

an ultrasonic transducer unit for fracturing particulates in a flow of exhaust;

an ultraviolet light unit for further breaking down particles in said flow of exhaust;

a magnetic particle filtering unit that attracts and captures particulates in said flow of exhaust; and an electronic control unit electrically connected with said ultrasonic transducer unit, said ultraviolet light unit, and said magnetic particle filtering unit.

13. The exhaust emissions filtering system of claim 12, wherein said ultrasonic transducer unit includes at least one ultrasonic transducer electrically connected with said electronic control unit.

14. The exhaust filtering system of claim 12, wherein said ultraviolet light unit includes at least one ultraviolet light electrically connected with said electronic control unit.

15. The exhaust filtering system of claim 12, wherein said magnetic particle filtering unit includes at least one magnetic rod surrounded by a mesh screen, said magnetic rod and said mesh screen being electrically connected with said electronic control unit.

16. The exhaust filtering system of claim 12, further comprising a second mesh screen connected with the inner diameter wall of said magnetic particle filtering unit for capturing particulates in said flow of exhaust.

17. The exhaust filtering system of claim 14, wherein said second mesh screen is electrically connected with said electronic control unit for applying current to said second mesh screen, thereby heating said second mesh screen and incinerating particulates captured in said second mesh screen.

18. The exhaust filtering system of claim 12, wherein said ultrasonic transducer unit, said ultraviolet light unit, and said magnetic particle filtering unit are positioned inside a cylindrical housing.

* * * * *